United States Patent [19]

Lin

[11] Patent Number: 5,639,065
[45] Date of Patent: Jun. 17, 1997

[54] VEHICLE JACK

[76] Inventor: Ching-Chung Lin, 5F, No. 16, Hong Chi Road, Nei Hwu, Taipei, Taiwan

[21] Appl. No.: 529,731

[22] Filed: Sep. 18, 1995

[51] Int. Cl.⁶ .................................................. B66F 3/24
[52] U.S. Cl. ............................................................ 254/421
[58] Field of Search ................................. 254/421, 423, 254/84, 85, 93 H

[56] References Cited

U.S. PATENT DOCUMENTS

| | | | |
|---|---|---|---|
| 1,488,038 | 3/1924 | Fiorentino | 254/421 |
| 1,930,959 | 10/1933 | Potrin et al. | 254/421 |
| 2,156,582 | 5/1939 | Carlini | 254/421 |
| 5,377,957 | 1/1995 | Mosley | 254/423 |

Primary Examiner—Robert C. Watson
Attorney, Agent, or Firm—Bacon & Thomas

[57] ABSTRACT

A vehicle jack including a top table fixed to the bottom side of a motor vehicle, a control unit mounted on the top table, the control unit having a rotation control lever, a lifting control lever, and an extension control lever, a power unit, which includes a battery, a motor connected to the battery, an oil tank, a hydraulic oil loop, and a pump driven by the motor to pump hydraulic oil out of the oil tank into the hydraulic oil loop, a base table revolvably coupled to the top table, the base table having a driven gear fastened to the top table, a driving gear meshed with the driven gear and driven by the rotation control lever through a motor pump being coupled to the hydraulic oil loop, and three stands equiangularly pivoted to the base table, each stand having two opposite reciprocating parts reciprocated by hydraulic oil from the hydraulic oil loop through the control of the lifting control lever and extension control lever of the control unit.

4 Claims, 4 Drawing Sheets

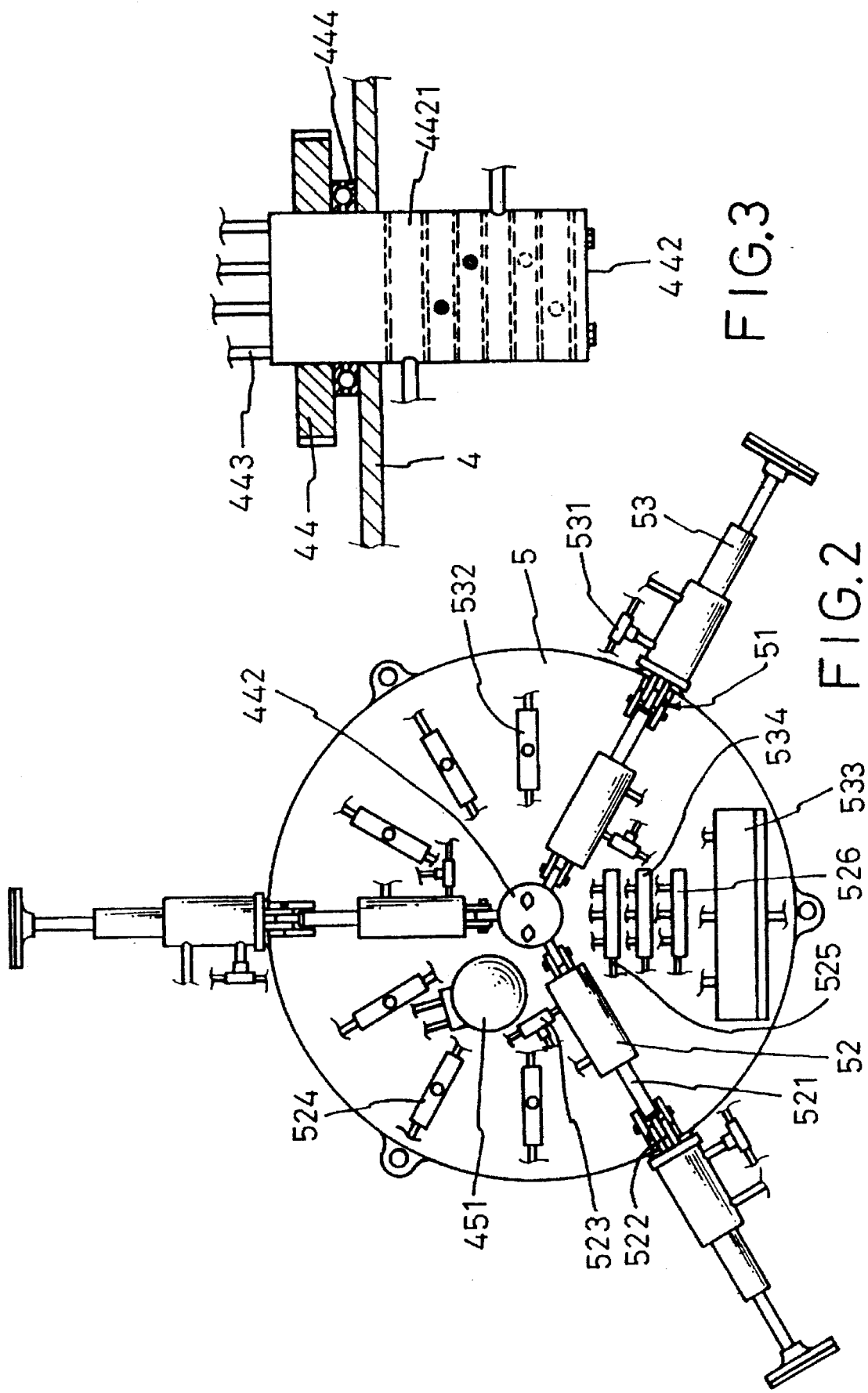

VEHICLE JACK

BACKGROUND OF THE INVENTION

The present invention relates to vehicle jacks, and relates more particularly to such a vehicle jack which is fixedly secured to the bottom of a motor vehicle and operated through a hydraulic system for lifting the motor vehicle from the ground and turning it to the desired direction.

Motor vehicles have become more and more popular nowadays. When a motor vehicle is stuck in the mud, a roadside ditch, etc., a jack or crane shall be used to lift the motor vehicle out of the constraint. Furthermore, when a car tire is exploded, it is difficult to replace the broken tire by the car driver without having a suitable jack or like means. There are known a variety of car jacks for lifting a car from the ground. However these car jacks cannot be operated to turn the car to the desired direction.

SUMMARY OF THE INVENTION

According to the preferred embodiment of the present invention, the vehicle jack comprises a top table fixedly secured to the bottom of a motor vehicle, the top table comprising a center through hole, a plurality of mounting holes around the center through hole, a plurality of lugs around the border respectively fastened to the bottom of the motor vehicle, and an annular groove on a bottom side thereof; a control unit mounted on the top table, the control unit comprising a rotation control lever, a lifting control lever, an extension control lever, and a vertical latch; a power unit, the power unit comprising a battery, a motor connected to the battery, an oil tank, a hydraulic oil loop, and a pump driven by the motor to pump hydraulic oil out of the oil tank into the hydraulic oil loop; a base table, the base table comprising an annular ball bearing at a top side thereof around the border corresponding to the annular groove of the top table, a plurality of steel balls respectively supported on the annular ball bearing and received within the annular groove of the top table, a plurality of equiangularly spaced lock holes for receiving the vertical latch for stopping the top table from rotary motion relative to the base table, a horizontal driven gear at the center, which has a plurality of mounting holes respectively fixedly connected to the mounting holes of the top table, a vertical shaft raised from the horizontal driven gear and coupled to the center through hole of the top table, and six hydraulic oil chambers respectively connected to the hydraulic oil loop, a driving gear meshed with the driven gear and driven by the rotation control lever through a motor pump being coupled to the hydraulic oil chambers; and three stands equiangularly pivoted to the base table at a bottom side opposite to the top table by a respective pivot, each stand comprised of an upper part and a lower part, the upper part comprising a reciprocating oil tube coupled to a tenon at one side of the respective pivot, the reciprocating oil tube being coupled to a check valve through a T-pipe, and then to a four-way connector, which receives hydraulic oil from one oil chamber of the vertical shaft, and a four-way connector for receiving hydraulic oil from one oil chamber of the vertical shaft for driving the respective reciprocating oil tube outwards, the lower part being a hydraulic cylinder forced backwards by hydraulic oil from a T-connector, which is coupled to a distribution valve through a check valve, the distribution valve receiving hydraulic oil from one oil chamber of the vertical shaft, the lower part being forced outwards by hydraulic oil from a four-way connector, which is coupled to one oil chamber of the vertical shaft, the reciprocating operation of the upper parts of the stands being controlled by the lifting control lever, the reciprocating operation of the lower parts of the stands being controlled by the extension control lever.

According to the present invention, the vehicle jack achieves various advantages as follows:

1) It permits the car to be rotated to the desired direction.
2) It can support the car above the ground when the car is parked, therefore no one can steal the car.
3) It makes the car tire repair work easy.
4) It can serve as an auxiliary emergency brake when the engine is stopped or the steering wheel or brake system is out of order.

BRIEF DESCRIPTION OF THE DRAWINGS

FIG. 2 is a perspective view showing the stands pivoted to the base table according to the present invention;

FIG. 3 is a side view in section of the base table according to the present invention;

DETAILED DESCRIPTION OF THE PREFERRED EMBODIMENT

Figure 1C:
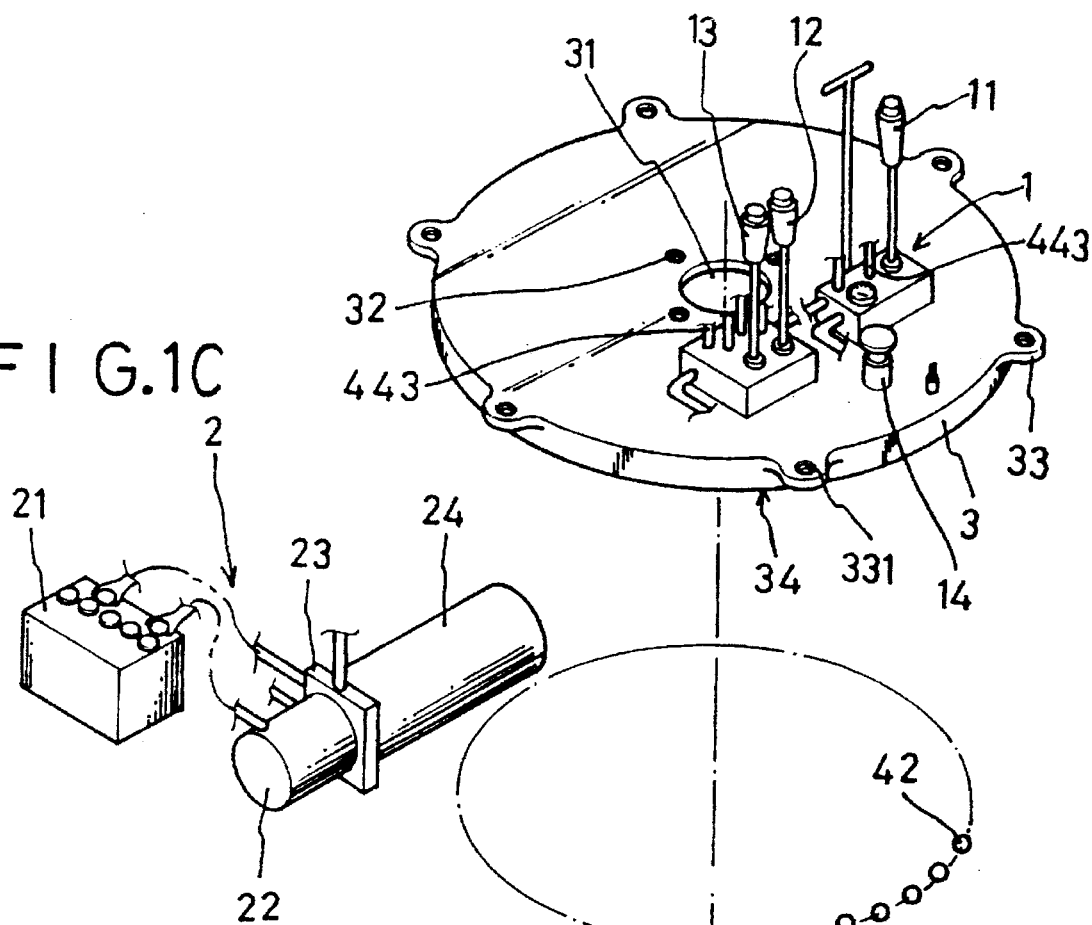
FIG. 1C is a perspective view of the power source utilized with the present invention.
Figure 1B:
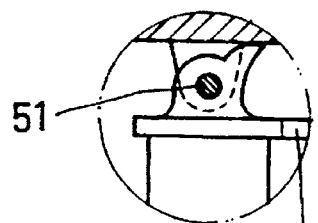
FIG. 1B is an enlarged view, partially in cross-section of area A in FIG. 1A.
Figure 1A:
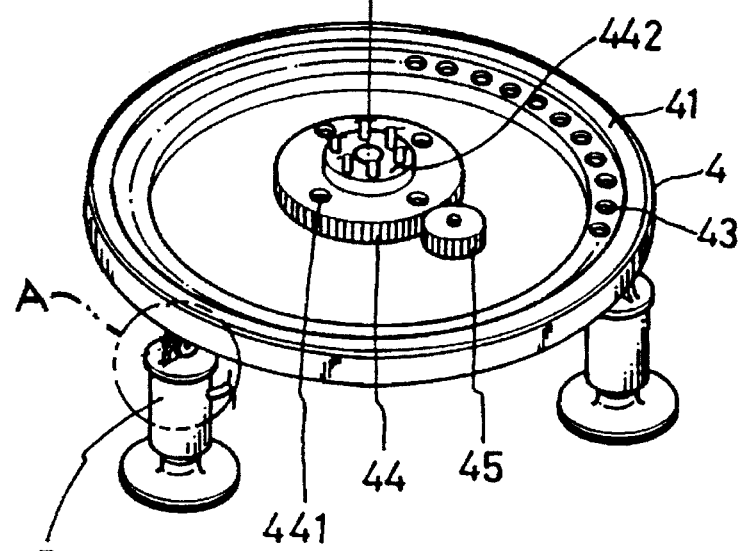
FIG. 1A is an exploded view of a vehicle jack according to the present invention.

Referring to the annexed drawings in detail, a vehicle jack in accordance with the present invention is generally comprised of a control unit 1, a power unit 2, a circular top table 3, a circular base table 4, and three stands 5.

The control unit 1 is mounted on the top table 3, comprised of a rotation control lever 11, a lifting control lever 12, an extension control lever 13, and a vertical latch 14. The vertical latch 14 is for locking the top table 3 and the base table 4 together. Meters or indicators may be installed in the control unit 1 for indexing of the operation of the control unit 1.

The power unit 2 comprises a battery 21, a motor 22 connected to the battery 22, an oil tank 24, and a pump 23 driven by the motor 22 to pump hydraulic oil out of the oil tank 24 to the other parts of the vehicle jack. The direction of the flow of hydraulic oil from the oil tank 24 is controlled by the control unit 1.

The top table 3 comprises a center through hole 31 for passing a vertical shaft 442, a plurality of mounting holes 32 around the center through hole 31, and a plurality of lugs 33 around the border, each lug 33 defining a mounting hole 331 for fastening to the bottom of a motor vehicle. The top table 3 further comprises an annular groove 34 (not shown) at the bottom side for holding steel balls 42.

The base table 4 comprises an annular ball bearing 41 at the top side around the border corresponding to the annular groove 34 of the top table 3, a plurality of steel balls 42 respectively supported on the annular ball bearing 41 and received within the annular groove 34 of the top table 3, a plurality of equiangularly spaced lock holes 43 for receiving the vertical latch 14, a horizontal driven gear 44 at the center, which has a plurality of mounting holes 441 respectively connected to the mounting holes 32 of the top table 3, a vertical shaft 442 raised from the horizontal driven gear 44 and coupled to the center through hole 31 of the top table 3, and six hydraulic oil pipes 443 respectively connected to the output port of the pump 23 through the control unit 1, a driving gear 45 meshed with the driven gear 44, and a motor pump 451 coupled to two hydraulic oil pipes 443 and controlled to turn the driving gear 45, causing it to reverse the driven gear 44.

Referring to FIGS. 2 and 3, the base table 4 further comprises six oil chambers 4421 respectively coupled to the six hydraulic oil pipes 443; a disk bearing 444 is mounted between the base table 4 and the driven gear 44 to reduce the friction.

The stands 5 are respectively pivotably connected to the base table 4 by a respective pivot 51 and equiangularly spaced from one another, each comprised of an upper part 52 and a lower part 53. The upper part 52 comprises a reciprocating oil tube 521 coupled to a tenon 522 at one side of the respective pivot 51. The reciprocating oil tube 521 is coupled to a check valve 524 through a T-pipe 523, and then to a four-way connector 525. The four-way connector 525 receives hydraulic oil from one oil chamber 4421 of the vertical shaft 442. A four-way connector 526 (one way for input and the other three ways for output) is provided to receive hydraulic oil from another oil chamber 4421 for driving the reciprocating oil tube 521 outwards. The lower part 53 is a hydraulic cylinder. The return stroke of the lower part 53 is achieved by hydraulic oil from a T-connector 531, which is coupled to a distribution valve 533 through a check valve 532. The distribution valve 533 receives hydraulic oil from another oil chamber 4421 of the vertical shaft 442. The outward stroke of the lower part 53 is achieved by hydraulic oil from a four-way connector 534, which is coupled to another oil chamber 4421 of the vertical shaft 442. Therefore, the oil chambers 4421 are arranged into three groups respectively for controlling the rotary motion of the driving gear 45, and the reciprocating motion the upper parts 52 of the stands 5, and the reciprocating motion of the lower parts lower parts 53 of the stands 5.

Figure 4:
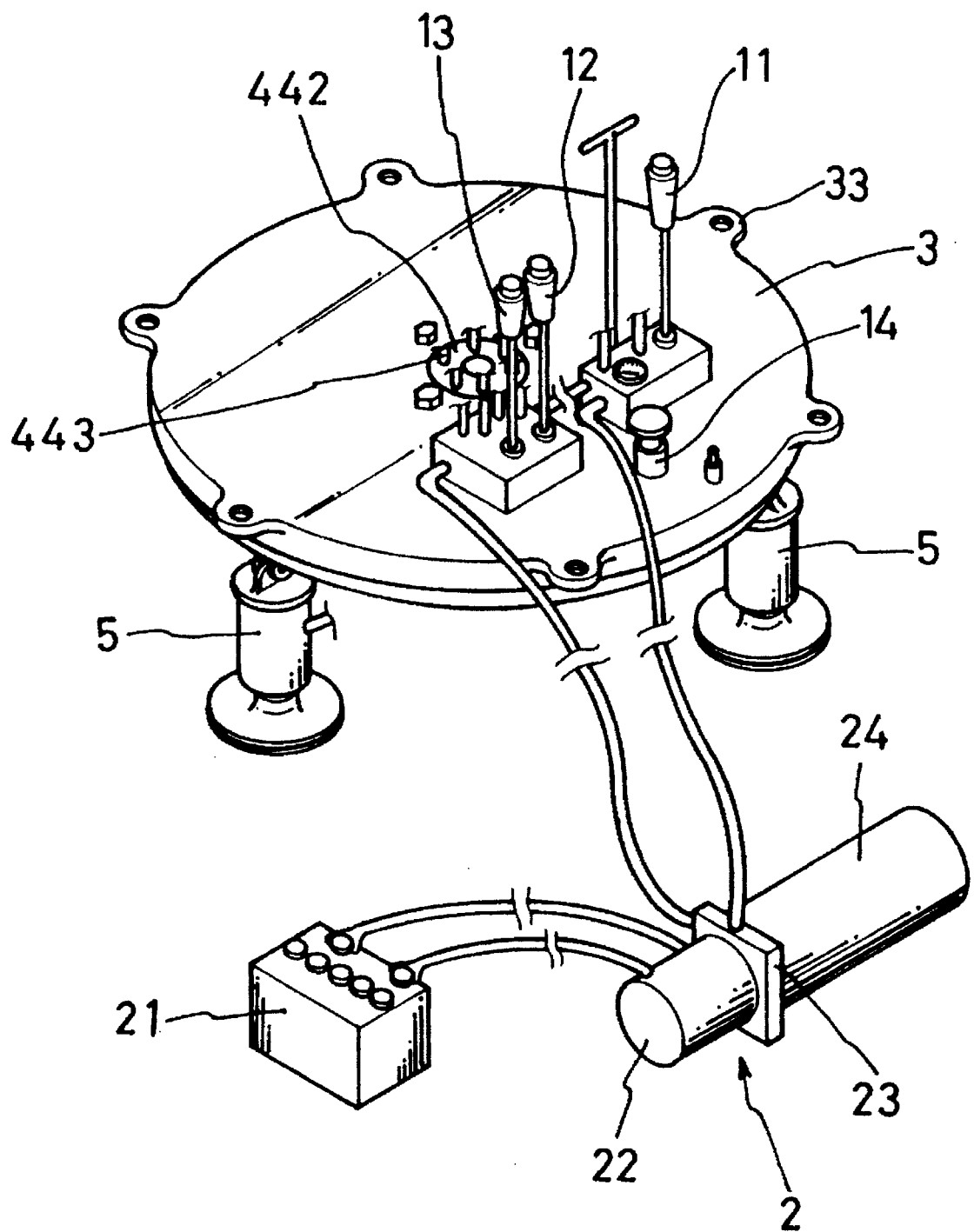
FIG. 4 is an elevational view of the vehicle jack according to the present invention.
Figure 5:
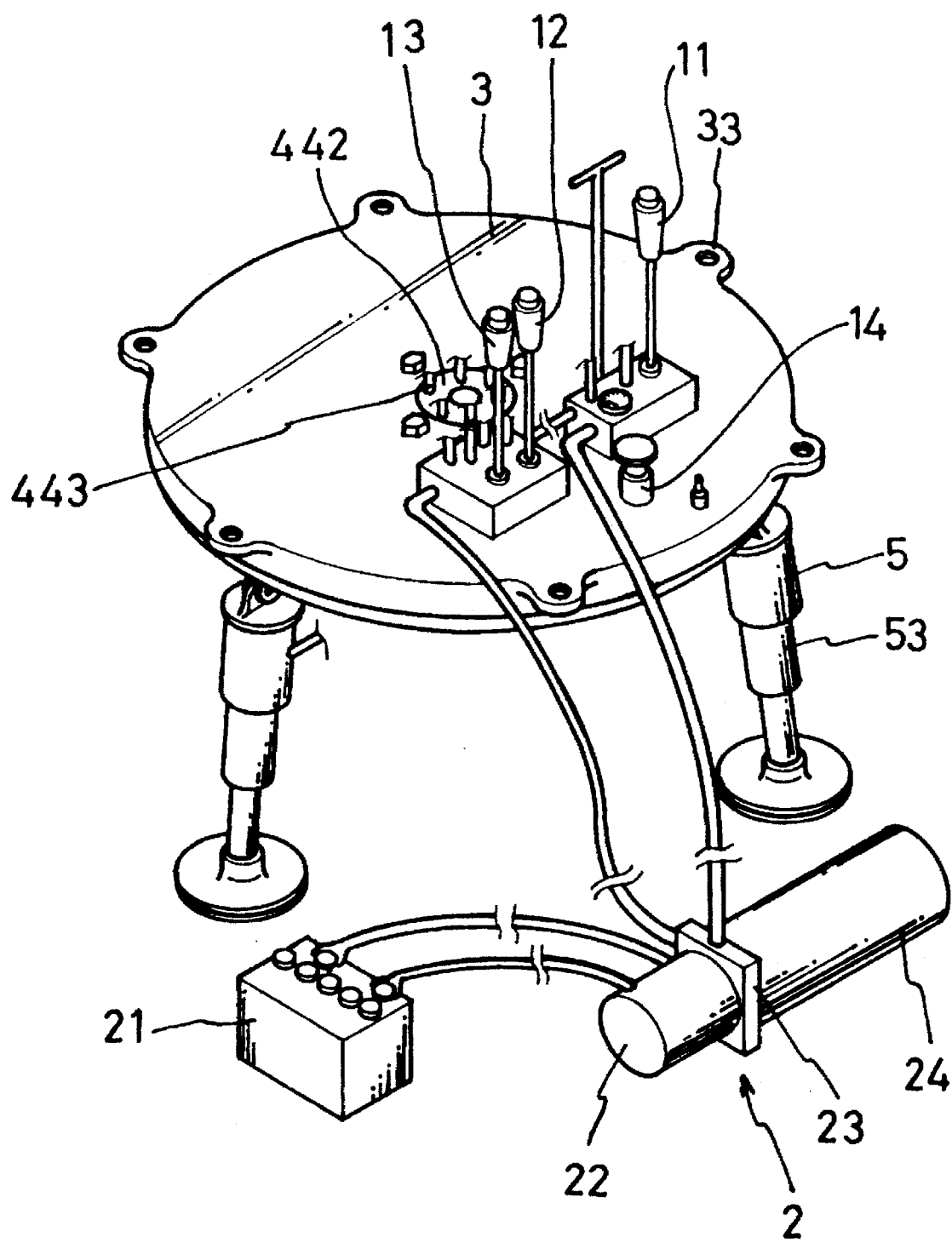
FIG. 5 is another elevational view of the vehicle jack of FIG. 4, showing the stands extended out.

Referring to FIGS. 4 and 5, the top table 3 is fastened to the motor vehicle at the bottom to hold the control unit 1 and the power unit 2, the base table 4 and the stands 5 are suspended from the bottom of the motor vehicle. When the lifting control lever 12 is operated, the reciprocating oil tubes 521 are forced out of the upper parts 52 of the stands, then the extension control lever 13 is operated to extend out the lower parts 53 of the stands 5. When the reciprocating oil tubes 521 are fully extended out, the check valves 524 stop hydraulic oil from reversing, and therefore the reciprocating oil tubes 521 are stopped in place to hold the motor vehicle above the ground. When wheels of the motor vehicle are lifted from the ground, the vertical latch 14 is pulled out of the lock holes 43 for permitting the top table 3 to be turned relative to the bottom table 4, then the rotation control lever 11 is shifted leftwards or rightwards to turn the driving gear 45 clockwise or counter-clockwise, causing the driven gear 44 to turn the top table 3 through the vertical shaft 442, and therefore the motor vehicle is turned to the desired direction. When the motor vehicle is turned to the desired direction, the latch 14 is inserted into one lock hole 43 to lock the top table 3, and therefore the tire repair work or other maintenance works can be performed. When the aforesaid procedures are performed reversely, the stands 52 are received back, and the motor vehicle is returned to its former position.

It is to be understood that the drawings are designed for purposes of illustration only, and are not intended as a definition of the limits and scope of the invention disclosed. For example, the bottom end of each stand 5 may be attached with a pivoted cushion.

I claim:
1. A vehicle jack comprising:

a top table fixedly secured to a bottom of a motor vehicle, said top table comprising a center through hole, a plurality of mounting holes around said center through hole, a plurality of lugs around a border respectively fastened to the bottom of the motor vehicle, and an annular groove on a bottom side thereof;

a control unit mounted on said top table, said control unit comprising a rotation control lever, a lifting control lever, an extension control lever, and a vertical latch;

a power unit, said power unit comprising a battery, a motor connected to said battery, an oil tank, a hydraulic oil loop, and a pump driven by said motor to pump hydraulic oil out of said oil tank into said hydraulic oil loop;

a base table comprising an annular ball bearing race at a top side thereof around a border corresponding to the annular groove of said top table, a plurality of steel balls respectively supported on said annular ball bearing race and received within the annular groove of said top table, a plurality of equiangularly spaced lock holes for receiving said vertical latch for stopping said top table from rotary motion relative to said base table, a horizontal driven gear having a plurality of mounting holes respectively fixedly connected to the mounting holes of said top table, a vertical shaft extending from said horizontal driven gear and coupled to the center through hole of said top table, the shaft having six hydraulic oil chambers, each respectively connected to said hydraulic oil loop, a driving gear meshed with said driven gear and driven by a motor pump being coupled to said hydraulic oil chamber and controlled by said rotation control lever; and three stands each pivoted to said base table at a bottom side opposite to said top table by a respective pivot, each stand comprised of an upper part and a lower part, said upper part comprising a reciprocating oil tube coupled to a tenon on said lower part at one side of the respective pivot, said reciprocating oil tube being coupled to a first check valve through a T-pipe, and then to a four-way connector, which receives hydraulic oil from one oil chamber of said vertical shaft, and a first four-way connector for receiving hydraulic oil from one oil chamber of said vertical shaft for driving the respective reciprocating oil tube outwards, said lower part comprising a hydraulic cylinder retracted by hydraulic oil from a T-connector, which is coupled to a distribution valve through a second check valve, said distribution valve receiving hydraulic oil from one oil chamber of said vertical shaft, said lower part being extended by hydraulic oil from a second four-way connector, which is coupled to one oil chamber of said vertical shaft, whereby the reciprocating operation of the upper parts of said stands are controlled by said lifting control lever, the reciprocating operation of the lower parts of said stands are controlled by said extension control lever.

2. The vehicle jack of claim 1 wherein each stand comprises a bottom end having a pivoted cushion.

3. The vehicle jack of claim 1 wherein said control unit further comprises meter and operation indicator means for indexing its operation.

4. The vehicle jack of claim 1 wherein said control unit further comprises a gear shifting control knob at the top of one control lever thereof.

* * * * *